United States Patent [19]
Arata

[11] Patent Number: 4,733,318
[45] Date of Patent: Mar. 22, 1988

[54] MAGNETIC TAPE DRIVING DEVICE

[75] Inventor: Tadao Arata, Inagi, Japan

[73] Assignee: Tanashin Denki Co., Ltd., Japan

[21] Appl. No.: 943,746

[22] Filed: Dec. 19, 1986

[30] Foreign Application Priority Data

May 21, 1986 [JP] Japan .............................. 61-76358[U]

[51] Int. Cl.⁴ ............................................. G11B 15/00
[52] U.S. Cl. ................................................... 360/137
[58] Field of Search ............................. 360/137, 90–96

[56] References Cited

U.S. PATENT DOCUMENTS 3,899,795 8/1975 Watanabe ............................ 360/137
4,445,159 4/1984 Nemoto et al. ..................... 360/137

Primary Examiner—Robert S. Tupper
Attorney, Agent, or Firm—Wegner & Bretschneider

[57] ABSTRACT

A magnetic tape driving device for a tape recorder or like machines wherein a base plate is partially formed from a synthetic resin material while eliminating possible mechanical and thermal shortcomings which may be resulted from employment of such a synthetic resin part for the base plate. The base plate of the magnetic tape driving device is composed of a metal plate and an overlying synthetic resin plate plate, and a bearing metal member is securely mounted on the synthetic resin plate for supporting a capstan thereon. The bearing metal member extends through an opening formed in the metal plate and is resiliently pressed against a receiving portion by a resilient contacting piece both formed on the metal plate thereby to position the bearing metal member and hence the synthetic resin plate relative to the metal plate.

5 Claims, 3 Drawing Figures

MAGNETIC TAPE DRIVING DEVICE

BACKGROUND OF THE INVENTION

1. Field of the Invention

This invention relates to a magnetic tape driving device for a tape recorder or like machines.

2. Description of the Prior Art

Magnetic tape driving devices for tape recorders or like machines conventionally employ a base plate formed from a metal plate. However, it has been also attempted to form such a base plate partially from a synthetic resin material. This allows reduction of the quantity of parts and the production costs of tape recorders because part mounting portions or pieces for mounting a number of parts, guide portions and the like can be integrally formed on such a synthetic resin portion.

However, where a base plate of a magnetic tape driving device is partially made of a synthetic resin material, the base plate has a reduced mechanical strength and a greater thermal deformation at the synthetic resin portion thereof. Accordingly, if a bearing metal member for supporting a capstan thereon is mounted only on the synthetic resin portion, this will cause a problem that the capstan may be slanted due to deformation of the synthetic resin portion or vibrations upon rotation of the capstan may increase and cause a phenomenon or resonance, which will extremely deteriorate the wow and flutter characteristic of the tape recorder.

Further, where the bearing metal member is held only by the synthetic resin portion, there is a drawback that because the bearing metal member is electrically insulated from the metal plate portion of the base plate, when the capstan is rotated at a high speed, a magnetic tape may coil around the capstan or electrostatic noises may be produced under the influence of static electricity generated by mutual contact betwen the capstan and the bearing metal member.

Therefore, in a magnetic tape driving device in which part of a tape recorder base plate is formed from a synthetic resin material, it is necessary to interconnect a bearing metal member for a capstan and a metal plate portion of the base plate by means of an earthing line in order to establish a conducting condition between them. Accordingly, it is a problem that a production step is increased for connection of such an earthing line and the production cost is increased accordingly.

SUMMARY OF THE INVENTION

It is an object of the present invention to provide a magnetic tape driving device which allows a base plate to be partially formed from a synthetic resin material while eliminating possible mechanical and thermal shortcomings which may be resulted from employment of such a synthetic resin part for the base plate.

It is another object of the invention to provide a magnetic tape driving device wherein a bearing metal member for supporting a capstan thereon is prevented from being electrically insulated from a base plate which is partially formed from a synthetic resin material without using a special means such as an earthing line.

It is a further object of the invention to provide a magnetic tape driving device which can be produced at a reduced cost.

According to the present invention, there is provided a magnetic tape driving device of the type wherein a reel receiving member and a capstan are mounted for rotation on a base plate while a head supporting member and a pinch roller supporting member are mounted for movement on said base plate, wherein said base plate is composed of a metal plate on which said reel receiving member is mounted, and a synthetic resin plate overlying said metal plate and having securely mounted thereon a bearing metal member for supporting said capstan thereon, said metal plate having an opening formed therein, said bearing metal member extending through said opening in said metal plate, said metal plate having a resilient contacting piece formed adjacent said opening thereof for resiliently pressing against an outer periphery of said bearing metal member, said metal plate further having a receiving portion formed adjacent said opening thereof for bearing a contacting force of said contacting piece acting on the opposite side of said bearing metal member, whereby said synthetic resin plate is positioned relative to said metal plate by contacting engagement of said resilient contacting piece and said receiving portion of said metal plate with said bearing metal member.

With the construction described above, since the bearing metal member for the capstan is held by both of the synthetic resin plate and the metal plate, defects of such an alternative construction that a bearing metal member is held only by a synthetic resin plate, that is, defects that the holding power of the synthetic resin plate for the bearing metal member is low and that the bearing metal member is electrically insulated from the metal plate, can be eliminated.

Further, since the bearing metal member is positioned by the resilient contacting piece and the receiving portion both provided on the metal plate portion, the synthetic resin plate is also positioned with high accuracy relative to the metal plate with respect to the position of the capstan.

The above and other objects, features and advantages of the present invention will become apparent from the following description and the appended claims, taken in conjunction with the accompanying drawing.

DESCRIPTION OF THE PREFERRED EMBODIMENTS

Figure 1:
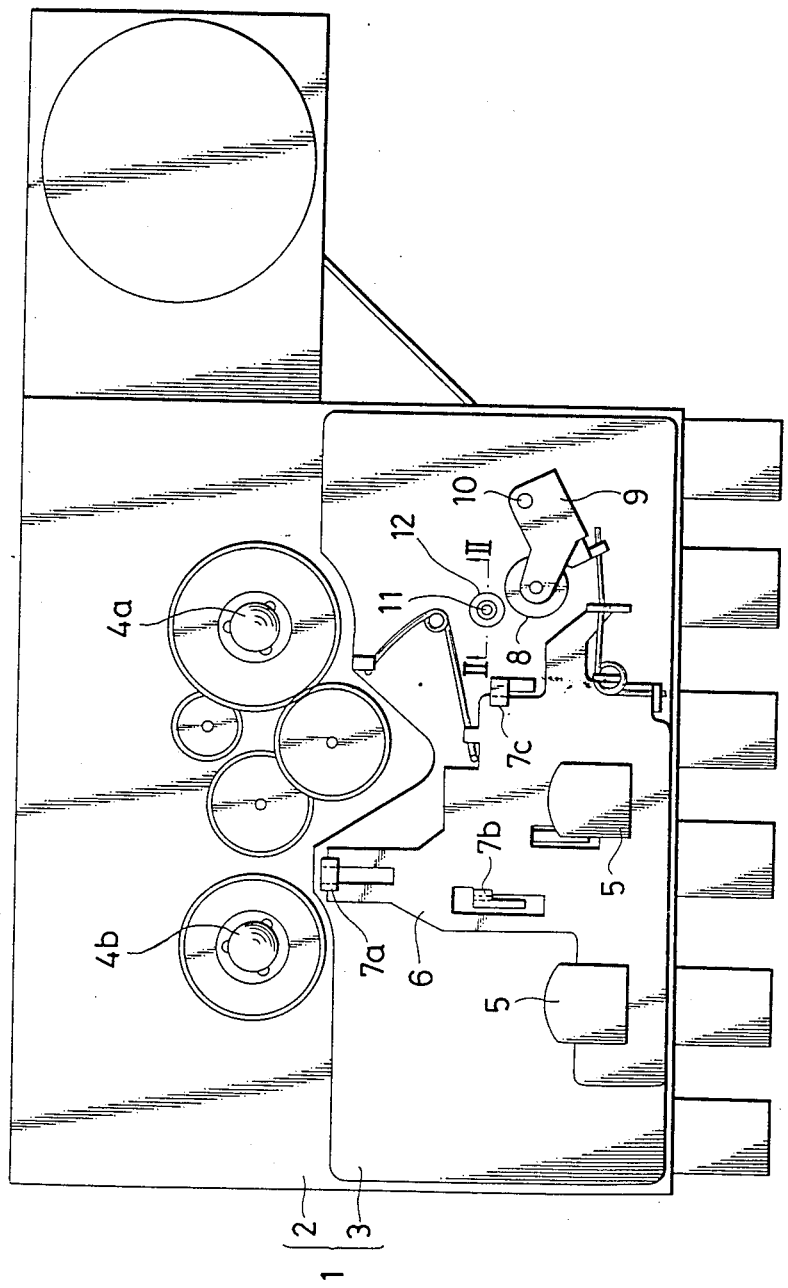
FIG. 1 is a plan view of a magnetic tape driving device for a tape recorder according to the present invention.

Referring first to FIG. 1, there is illustrated a magnetic tape driving device according to the invention. The magnetic tape driving device shown includes a base plate generally denoted at 1.

The base plate 1 is composed of a metal plate 2 and an integral synthetic resin plate 3 overlying the metal plate 2, and a pair of reel receiving members 4a, 4b are supported for rotation on the metal plate 2.

Meanwhile, the synthetic resin plate 3 has integrally formed thereon guide portions 7a, 7b, 7c for mounting a head supporting member 6 for back and forth movement thereon, a support shaft 10 for mounting a pinch roller supporting member 9 for pivotal movement thereon, and other mounting portions for mounting other parts thereon and other guide portions. A magnetic head 5 is supported on the head supporting member 6, and a pinch roller 8 is supported on the pinch roller supporting member 9.

Figure 2:
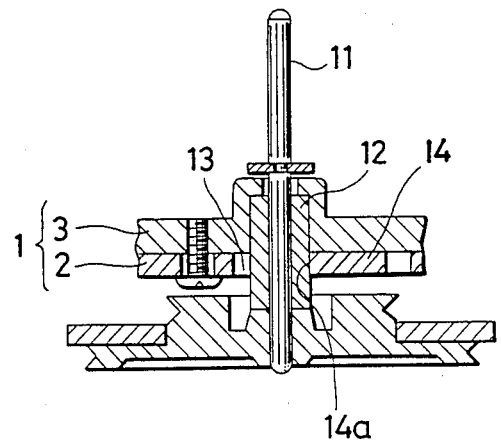
FIG. 2 is an enlarged sectional view taken along line II—II of FIG. 1.

Further, a bearing metal member 12 for supporting a capstan 11 for rotation thereon is securely mounted in a portion of the synthetic resin plate 3 by a suitable means such as a press fitting (refer to FIG. 2). A lower half of the bearing metal member 12 extends through an opening 13 formed in the metal plate 2 and below a lower face of the metal plate 2.

Figure 3:
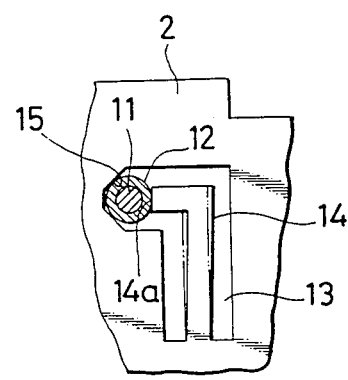
FIG. 3 is a plan view illustrating relations between a metal plate and a bearing metal member of the magnetic tape driving device of FIG. 1.

Referring now to FIG. 3, the opening 13 in the metal plate 12 has a substantially L-shape in plan, and a resilient contacting piece 14 is formed on the metal plate 2 and extends in and along the opening 13 from an edge of the opening 13. The contacting piece 14 has a substantially L-shape similar to that of the opening 13 with an end portion thereof bent substantially at a right angle and is so formed to have a suitable resiliency that an end face 14a of the bent portion thereof may be resiliently contacted with an outer periphery of the bearing metal member 12. The opening 13 is substantially V-shaped at a portion thereof opposing to the bent end face 14a of the contacting piece 14, and thus both of the inclined faces of the V-shape cooperatively serve as a receiving portion 15 for receiving the bearing metal member 12 therein. Thus, the receiving portion 15 bears a contacting force of the contacting piece 14 on the opposite side of the bearing metal member 12.

With the construction described above, the bearing metal member 12 is supported at three points thereof by the bent end face 14a and the two inclined faces of the receiving portion 15. Since the bearing metal member 12 is held by both of the synthetic resin plate 3 and the metal plate 2 in this manner, defects of such an alternative construction that a bearing metal member is held only by a synthetic resin plate, that is, defects that the holding power of a resin plate for holding a bearing metal member thereon is low and that a bearing metal member may be electrically insulated from a metal plate, can be eliminated.

Further, since the bearing metal member 12 is positioned by the resilient contacting piece 14 and the receiving portion 15 both provided on the metal plate 2, the synthetic resin plate 3 is also positioned with high accuracy relative to the metal plate 2.

As has been described with respect to the embodiment, according to the present invention, a magnetic tape driving device can be provided wherein part of a base plate is formed from a synthetic resin material with part mounting portions and/or guide portions formed integrally on the synthetic resin portion to reduce the cost and supplement the mechanical and thermal shortcomings of the synthetic resin portion while allowing the bearing metal member to be prevented from being electrically insulated without using an earthing line.

It is to be noted that the present invention is not limited to the construction of the embodiment. For example, the shape of the receiving portion may be an arcuate shape having a same radius of curvature with the outer periphery of the bearing metal member instead of the V-shape.

In the meantime, while the synthetic resin plate may be mounted on the metal plate by a suitable means such as a fastening screw, where the former is mounted on the latter by means of a fastening screw, it is preferable that the diameter of a hole formed in the metal plate 2 for passing a screw therethrough may be sufficiently greater than the outer diameter of the screw to allow movement of the synthetic resin plate 3 in a horizontal direction relative to the metal plate 2. This will further facilitate positioning of the synthetic resin plate 3 with respect to the capstan 11.

Having now fully described the invention, it will be apparent to one of ordinary skill in the art that many changes and modifications can be made thereto without departing from the spirit and scope of the invention as set forth herein.

What is claimed is:

1. In a magnetic tape driving device of the type wherein a reel receiving member and a capstan are mounted for rotation on a base plate while a head supporting member and a pinch roller supporting member are mounted for movement on said base plate, the improvement wherein said base plate is composed of a metal plate on which said reel receiving member is mounted, and a synthetic resin plate overlying said metal plate and having securely mounted thereon a bearing metal member for supporting said capstan thereon, said metal plate having an opening formed therein, said bearing metal member extending through said opening in said metal plate, said metal plate having a resilient contacting piece formed adjacent said opening thereof for resiliently pressing against an outer periphery of said bearing metal member, said metal plate further having a receiving portion formed adjacent said opening thereof for bearing a contacting force of said contacting piece acting on the opposite side of said bearing metal member, whereby said synthetic resin plate is positioned relative to said metal plate by contacting engagement of said resilient contacting piece and said receiving portion of said metal plate with said bearing metal member.

2. A magnetic tape driving device according to claim 1, wherein said bearing metal member is securely mounted on said synthetic resin plate by press fitting.

3. A magnetic tape driving device according to claim 1, wherein said opening of said metal plate has an elongated substantially L-shape and said resilient contacting piece has a similarly elongated substantially L-shape and extends in and along said opening from an edge of said opening, said resilient contacting piece being contacted at a free end thereof with said bearing metal member.

4. A magnetic tape driving device according to claim 1, wherein said opening in said metal plate is substantially V-shaped at a portion thereof opposing to said resilient contacting piece, and said receiving portion is provided by both of inclined faces of the V-shape of said opening.

5. A magnetic tape driving device according to claim 1, wherein said opening in said metal plate has an arcuate at a portion thereof opposing to said resilient contacting piece, the arcuate shape having a same radius of curvature with the outer periphery of said bearing metal member, and said receiving portion is provided by a face of the arcuate shape of said opening.

* * * * *